United States Patent
Ezure et al.

(10) Patent No.: US 6,913,129 B2
(45) Date of Patent: Jul. 5, 2005

(54) SENSOR MOUNTING MECHANISM FOR A CLUTCH CASE

(75) Inventors: Yoshinobu Ezure, Saitama (JP); Mayumi Kubota, Saitama (JP); Masataka Yoshida, Saitama (JP); Toshifumi Yamada, Saitama (JP); Eiji Matsuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 309 days.

(21) Appl. No.: 10/261,780

(22) Filed: Oct. 2, 2002

(65) Prior Publication Data

US 2003/0096673 A1 May 22, 2003

(30) Foreign Application Priority Data

Nov. 19, 2001  (JP) ........................................ 2001-353407

(51) Int. Cl.[7] .............................................. F16D 13/58
(52) U.S. Cl. .................................. 192/30 W; 192/113.4
(58) Field of Search ........................... 192/30 W, 113.1, 192/113.23, 113.4

(56) References Cited

U.S. PATENT DOCUMENTS

| | | | | |
|---|---|---|---|---|
| 4,493,409 A | * | 1/1985 | Steeg | 192/115 |
| 5,231,284 A | * | 7/1993 | Mizutani et al. | 250/231.13 |
| 5,847,275 A | * | 12/1998 | Kondo et al. | 73/202.5 |

FOREIGN PATENT DOCUMENTS

| | | | | |
|---|---|---|---|---|
| JP | 57118125 A | * | 7/1982 | G01K/1/08 |
| JP | 8-244489 | | 9/1996 | |
| JP | 8-334043 | | 12/1996 | |

* cited by examiner

*Primary Examiner*—Richard M. Lorence
(74) *Attorney, Agent, or Firm*—Westerman, Hattori, Daniels & Adrian, LLP

(57) ABSTRACT

A sensor mounting mechanism for a clutch case is provided, which can not only prevent temperature rise of a sensor but also simplify mounting of the sensor on the clutch case. The sensor mounting mechanism is for a clutch case which houses a clutch and a detection object (a pulse gear) rotating with the clutch in unison. A sensor for detecting a rotation of the detection object is inserted through a hole made on the clutch case with a thermal insulator (spacer) and a detector of the sensor is oriented opposite to the detection object.

8 Claims, 4 Drawing Sheets

SENSOR MOUNTING MECHANISM FOR A CLUTCH CASE

FIELD OF THE INVENTION

The present invention relates to a sensor mounting mechanism for a clutch case, which provides thermal insulation and cooling to a sensor for monitoring the rotation of a clutch.

BACKGROUND OF THE INVENTION

When the number of revolution of a clutch is used for engine control, it has conventionally been obtained by the detector of a pulse sensor, which detects shifting of tooth flanks of a ring-like pulse gear provided around a flywheel.

As shown in FIG. 4A, a sensor mounting mechanism 101 for a clutch case has been known, as an example, in which a pulse sensor 110 is inserted through a hole 103 into a clutch case 102, orienting a detector 111 of the pulse sensor 110 opposite to tooth flanks 100P1 of a pulse gear 100P. Numeral 112 refers to a support element for fixing the pulse sensor 110 to the clutch case 102 with a bolt 106 inserted in mounting hole 113 and numeral 104 refers to a boss formed inside the clutch case 102 for securely fixing the pulse sensor 110, respectively.

The conventional sensor mounting mechanism 101 for a clutch case has the problems described below.

Since the pulse sensor 110 contacts with the clutch case 102, there exists heat transfer between the clutch case 102 and the pulse sensor 110. The temperature of pulse sensor 110 will therefore rise, resulting in malfunction, when the clutch case 102 reaches high temperature.

The clutch case 102 manufactured by casting, which has a dead material 104a right under a boss 104 formed while the mold is extracted upward, inevitably weighs much. A mold which doesn't leave the dead material 104a requires complication, thereby resulting in an increase in manufacturing cost.

The adjustment of the clearance between the pulse sensor 110 and the detector 111 requires positioning of pulse sensor 110 by machining the clutch case 102, thereby involving a problem that mounting of the pulse sensor 110 inevitably becomes complicated, since the pulse sensor 110 is secured directly to the clutch case 102.

SUMMARY OF THE INVENTION

The object of the present invention is to assess the problems described above, providing a sensor mounting mechanism for a clutch case, which can not only prevent temperature rise of a sensor but also simplify mounting of the sensor on the clutch case.

The present invention provides a sensor mounting mechanism for a clutch case which houses a clutch and a detection object rotating with the clutch in unison. The mechanism has a hole made on the clutch case through which a sensor for detecting a rotation of the detection object is inserted, and orients a detector of the sensor opposite to the detection object. It also has a thermal insulator provided around the sensor.

The sensor for detecting rotation of the detection object rotating with the clutch in unison is, for example, a pulse sensor, which confronts depressions and projections positioned alternately such as tooth flanks with a given clearance and detects shifting of tooth flanks, can monitor the rotation of clutch.

Though the shape and material of a thermal insulator are not limited, a material having high thermal insulation characteristics such as a phenolic resin is preferred.

The present invention provides a thermal insulator between the sensor and the clutch case, which insulates the heat transferred from the latter to the former, thereby enabling the prevention of sensor temperature rise.

Also the sensor, which is fixed to the clutch case by the thermal insulator stably, does not necessitate a boss formed on the inner surface of the clutch case any more. It can eliminate a dead material inherent to manufacturing of the boss by molding, thereby allowing a reduction in the clutch case weight.

Further if the thermal insulator is provided overall around the sensor, which is actually required for some portion between the sensor and the clutch case, the damage anticipated during disassembling of the clutch caused by inadvertent hitting of the sensor by clutch parts or tools can be prevented.

The present invention also provides the sensor mounting mechanism for a clutch case, in which a gap is provided between the thermal insulator and the sensor.

According to the present invention, the air existing between the sensor and the thermal insulator restricts the heat transferred to the latter from reaching the former, thereby improving thermal insulation between them.

As another feature, the present invention provides the sensor mounting mechanism for a clutch case, in which the gap includes an inlet for introducing air into the gap and an outlet for discharging the air in the gap into the clutch case so that the air can circulate in the gap.

According to this feature of the present invention, the air passage formed by the gap can discharge the air containing heat absorbed from the sensor and the thermal insulator, thereby enabling their efficient air-cooling.

In a further feature, the present invention provides the sensor mounting mechanism for a clutch case, in which the outlet is located front relative to a rotational direction of the detection object around the detector.

The local pressure inside the clutch case located at the front of the thermal insulator relative to the rotational direction of the detection object decreases while the detection object is rotating.

According to this feature of the present invention, the air in the gap is sucked into the pressure decreased clutch case to be discharged efficiently, thereby improving the cooling effect, since the outlet for air discharging is provided at the front relative to the rotational direction of the detection object.

The present invention further presents the sensor mounting mechanism for a clutch case, in which the thermal insulator includes a mounting element through which the sensor is secured to the clutch case.

The invention provides plural kinds of thermal insulators which have mounting elements with different thicknesses, allowing selection of a thermal insulator with a desirable thickness of mounting element. Adjustment of the sensor location can then be performed without machining the clutch case since the sensor can be positioned through the mounting element and fixed to the clutch case.

Therefore, the sensor mounting mechanism for a clutch case of the present invention can attain normal operation of the sensor by reliable protection against the sensor temperature rise even if the engine temperature climbs, since not only thermal insulation between the sensor and the clutch case is enhanced but also the sensor is cooled effectively. Mounting of the sensor on the clutch case can also be simplified.

BRIEF DESCRIPTION OF THE DRAWINGS

FIG. 4 is a view showing a sensor mounting mechanism for a clutch case according to the prior art.

DESCRIPTION OF THE PREFERRED EMBODIMENTS

An embodiment of the present invention will now be described in detail referring to the accompanying drawings.

As an example of the sensor mounting mechanism for a clutch case of the present invention, a mechanism will be described, in which a pulse sensor for detecting the number of revolution of a pulse gear is mounted on a clutch case.

Figure 1:
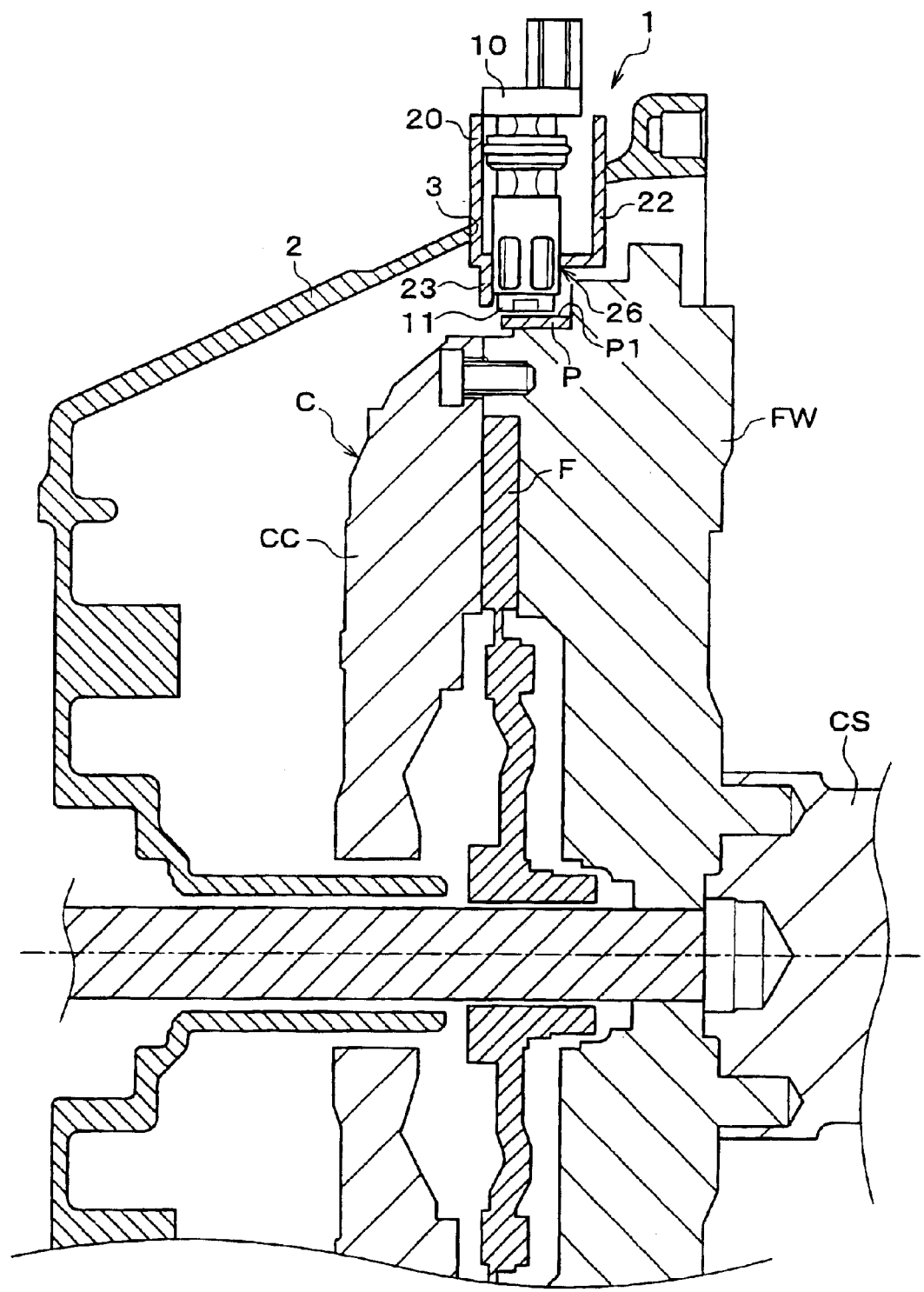
FIG. 1 is a sectional view showing the sensor mounting mechanism for a clutch case according to an embodiment of the present invention.

FIG. 1 is a sectional view showing the sensor mounting mechanism for a clutch case according to an embodiment of the present invention. In this embodiment, the left in FIG. 1 is assumed to be the front direction.

As shown in FIG. 1, a clutch C to which a sensor mounting mechanism 1 for a clutch case is applied includes: a clutch case 2 housing a flywheel FW which rotates with a crank shaft CS in unison and a clutch cover CC, and a disk-like facing F, which is connected to a transmission, lying between the flywheel FW and the clutch cover CC. The clutch C is a conventional type in which the facing F interposed between the flywheel FW and the clutch cover CC rotates in unison to transmit the rotation of crank shaft CS to the transmission. A ring-like pulse gear P (detection object), which has tooth flanks P1 around its external circumferential surface, is provided around the flywheel FW.

Figure 2A:
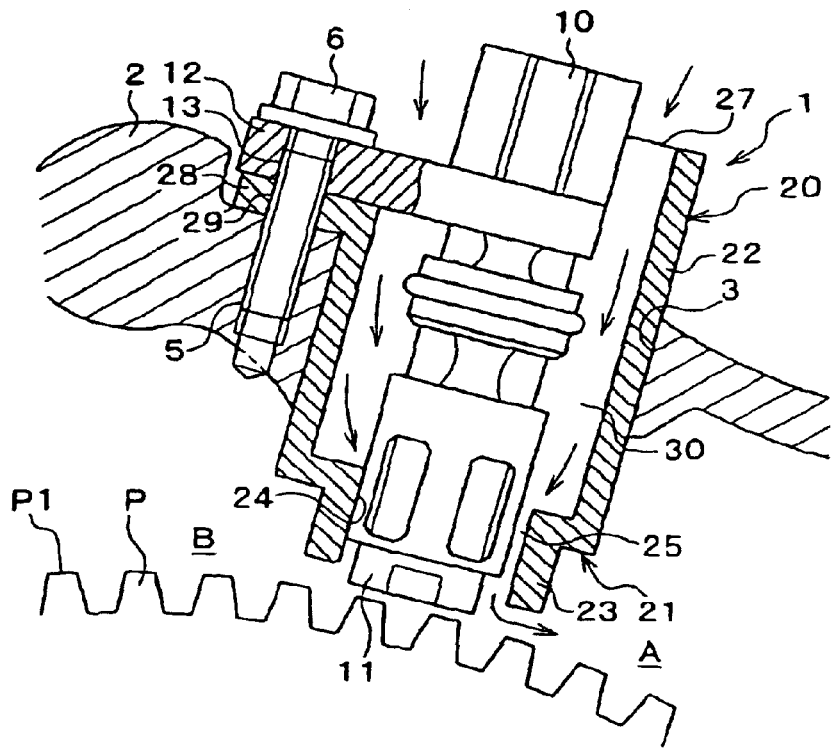
FIG. 2A is a front sectional view and FIG. 2B a perspective view showing a spacer.

As shown in FIG. 1 and FIG. 2A, the sensor mounting mechanism 1 has a hollow spacer 20 (thermal insulator) of a cylinder-like shape inserted through a hole 3 into the clutch case 2. And a detector 11 situated on an end of a pulse sensor 10 is oriented opposite to the tooth flanks P1 of pulse gear P by inserting the pulse sensor 10 through the spacer 20.

The constituents of the sensor mounting mechanism 1 for a clutch case will next be described.

As shown in FIG. 1 and FIG. 2A, the clutch case 2 has the hole 3 which accommodates mating of the spacer 20 so that it can face the pulse gear P. And in the vicinity of hole 3 is formed a threaded hole 5 for fixing the spacer 20 and the pulse sensor 10 with a bolt 6. In this connection the location of hole 3 is not limited to the example described above but has flexibility depending on the constituents of a clutch case.

The pulse sensor 10, as shown in FIG. 1 and FIG. 2A, has the detector 11 at its end, which is equipped with a magnet surrounded by a coil. An alternating current is generated at the coil depending on the change of magnetic flux while the teeth of pulse gear P are passing by, when the pulse gear P rotates with a given clearance between the detector 11 and the tooth flanks P1. A number of revolution of clutch C, which rotates with the pulse gear P in unison, is detected by measuring the number or interval of the pulse which is produced by shaping of the alternating current. In this connection it is preferred that the clearance between the detector 11 and the pulse gear P be about 1 to 2 mm. A mounting element 12, which has a mounting hole 13 for fixing the pulse sensor 10 to both the spacer 20 and the clutch case 2 with the bolt 6, projects from the upper portion of pulse sensor 10.

The sensor for detecting the number of revolutions of pulse gear P is not limited to the aforementioned pulse sensor 10 but an optical sensor and a sensor using magnetic reluctance element (MRE sensor) may be selected alternatively.

Figure 2B:
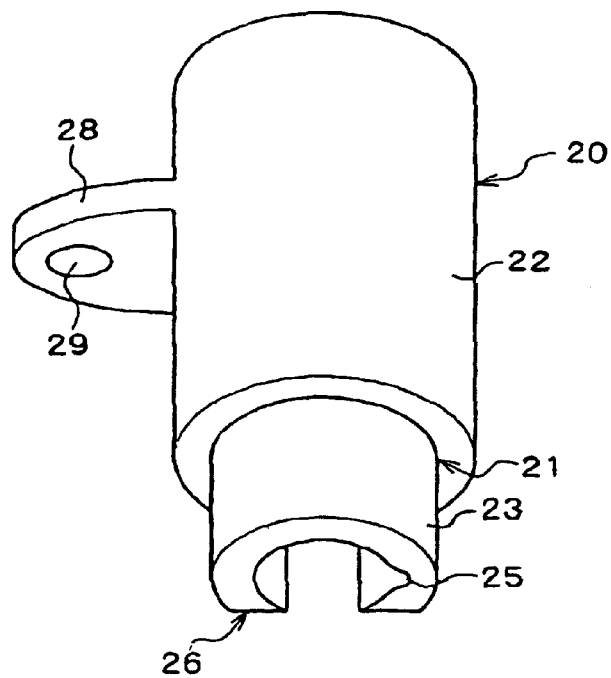
FIG. 2 is a view showing the sensor mounting mechanism for a clutch case according to an embodiment of the present invention.

As shown in FIGS. 1 and 2, the spacer 20 is a cylindrical aluminum alloy element and made of an upper portion 22 and a lower portion 23 separated by a step 21. Both the outer and inner diameters of lower portion 23 are smaller than those of upper portion 22.

The inner diameter of upper portion 22, which is formed larger than the outer diameter of pulse sensor 10, can provide a gap 30 between the pulse sensor 10 inserted through the center of spacer 20 and the upper portion 22. The uppermost portion of gap 30 is opened at the top end of spacer 20, forming an inlet 27 communicating with the outside of clutch case 2.

The lower portion 23 of spacer 20, whose inner diameter is adjusted so that the pulse sensor 10 can be inserted in contact with an inner wall 24. On the inner wall 24 is formed an outlet 25 of a groove. The outlet 25 is configured so that the gap 30 can communicate with the inside of clutch case 2 at a front A, which is located at a front of the thermal spacer relative to a rotational direction of the pulse gear P. A cutout 26 is provided for a part of the lower portion 23 facing the flywheel FW so as to avoid the interference with flywheel FW.

A flange 28 (mounting portion), which has a mounting hole 29 for fixing the spacer 20 to the clutch case 2 with the bolt 6, projects from the external wall of spacer 20. The lower surface of flange 28 is fixed to the clutch case 2 in contact with the external wall of clutch case 2. In this connection a given clearance can be provided between the lower end of spacer 20 and the pulse gear P when the spacer 20 is fixed to the clutch case 2.

The spacer 20, which covers the pulse sensor 10 overall in a circumferential direction, serves as a protector for the pulse sensor 10, thereby preventing damage to the pulse sensor 10 caused by inadvertent hitting with clutch parts or tools during disassembling of the clutch C.

Steps for mounting of the pulse sensor 10 to the clutch case 2 will now be described.

As shown in FIG. 2A, the spacer 20 is inserted through the hole 3 into the clutch case 2, temporarily fixed to the clutch case 2 aligning the mounting hole 29 of flange 28 with the threaded hole 5 of clutch case 2.

The spacer 20 and the pulse sensor 10 are fixed to the clutch case 2 with the bolt 6 in the following steps: inserting the pulse sensor 10 into the spacer 20, aligning the mounting hole 13 of mounting element 12 with the mounting hole 29, and tightening the bolt 6 into the threaded hole 5 of clutch case 2 after inserting the bolt 6 through the mounting holes 13 and 29. Since the preferable clearance between the detector 11 and the tooth flanks P1 is 1 to 2 mm, otherwise an adjustment should be made. Specifically when it is too large, the clearance is adjusted to be smaller by lowering the position of pulse sensor 10 replacing the spacer 20 with another spacer having a thinner flange. On the other hand when it is too small, the clearance is adjusted to be larger with another spacer having a thicker flange. In this way the clearance between the detector 11 and the tooth flanks P1 can be adjusted easily. In this connection the clearance may be adjusted to be smaller by machining the top surface of flange 28 when it is too large. Also the clearance may be adjusted to be larger by interposing a plate-like material between the mounting element 12 of pulse sensor 10 and the flange 28 when it is too small.

Steps of cooling of the pulse sensor 10 will now be described.

As shown in FIG.2A, the air flow around the pulse gear P is interrupted by the spacer 20 while the pulse gear P is rotating in the clutch case 2. A pressure drop subsequently occurs at the front A of the spacer 20, which is located at a front of the thermal spacer relative to a rotational direction of pulse gear P. The air in gap 30 is then sucked into the pressure-dropped clutch case 2 though the outlet 25, which communicates with the gap 30 and is provided at the lower portion of spacer 20 in the front A. The gap 30 communicates with the outside of clutch case 2 through inlet 27, thereby introducing fresh air from the outside of clutch case 2 once the air in the gap 30 is sucked into the clutch case 2. The air coming from the outside of clutch case 2 flows around pulse sensor 10 and is sucked into clutch case 2 through the outlet 25 after absorbing heat from the pulse sensor 10 and the spacer 20, thereby cooling them effectively.

The sensor mounting mechanism 1 for a clutch case according to a preferred embodiment of the present invention can not only enhance thermal insulation between the pulse sensor 10 and the clutch case 2 but also cool the former effectively, thereby enabling the prevention of temperature rise for the pulse sensor 10 and its stable operation free from engine temperature rise.

While the invention has been described in detail and with reference to an exemplary preferred embodiment thereof, it will be apparent to one skilled in the art that various changes and modifications can be made therein without departing from the spirit and scope thereof.

Figure 3A:
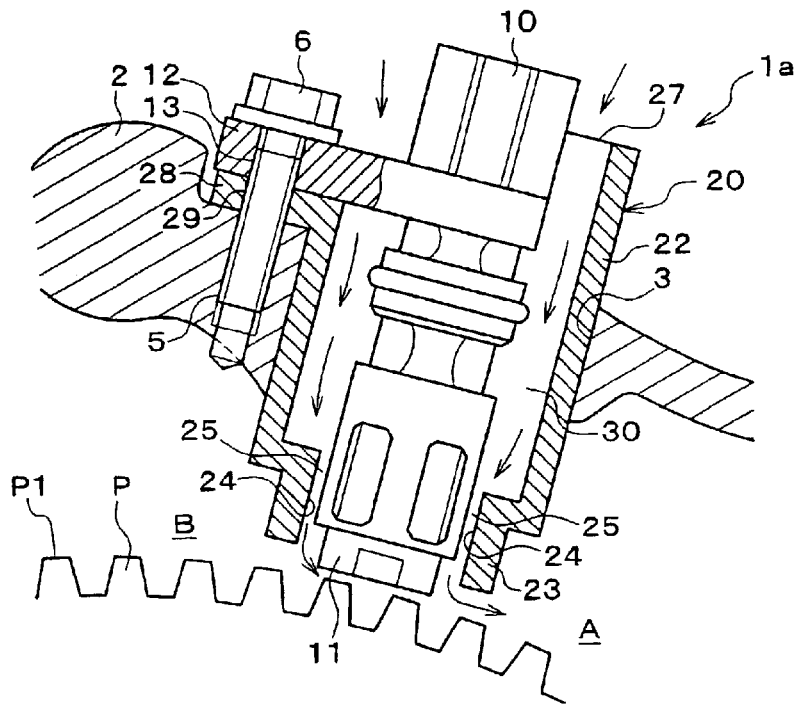
FIG. 3A a front sectional view showing a spacer having two outlets and FIG. 3B a front sectional view showing a spacer having no outlets.

The number and location of outlet 25 formed on the internal wall 24 at the lower portion 23 of spacer 20 are not limited to the one exemplified in the preferred embodiment, for example. They may be configured like a sensor mounting mechanism 1a for a clutch case shown in FIG. 3A, in which the air discharge amount from gap 30 is increased by forming two outlets front and rear relative to a rotational direction of pulse gear P on the inner wall 24 in the lower portion 23.

Figure 3B:
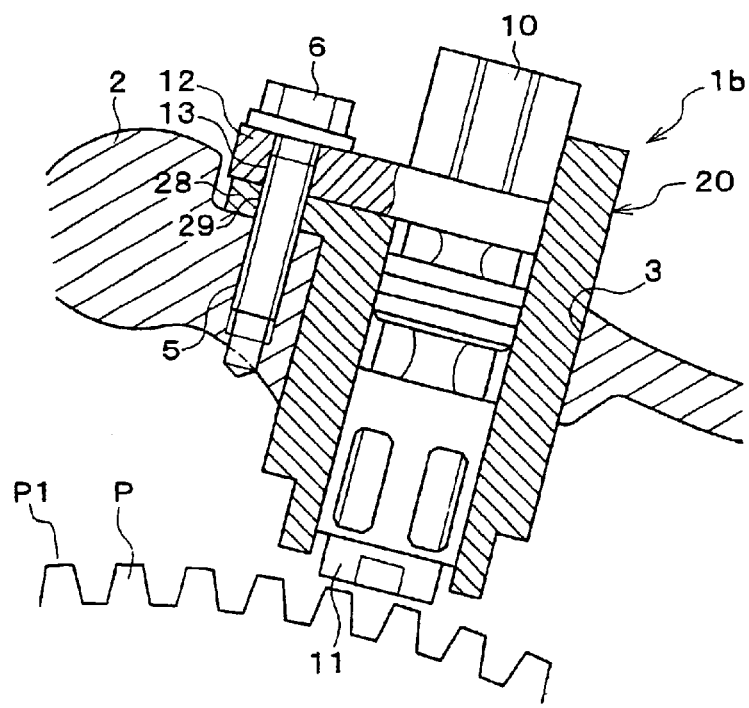
FIG. 3 is a view showing another sensor mounting mechanism for a clutch case according to an embodiment of the present invention.
Figure 4A:
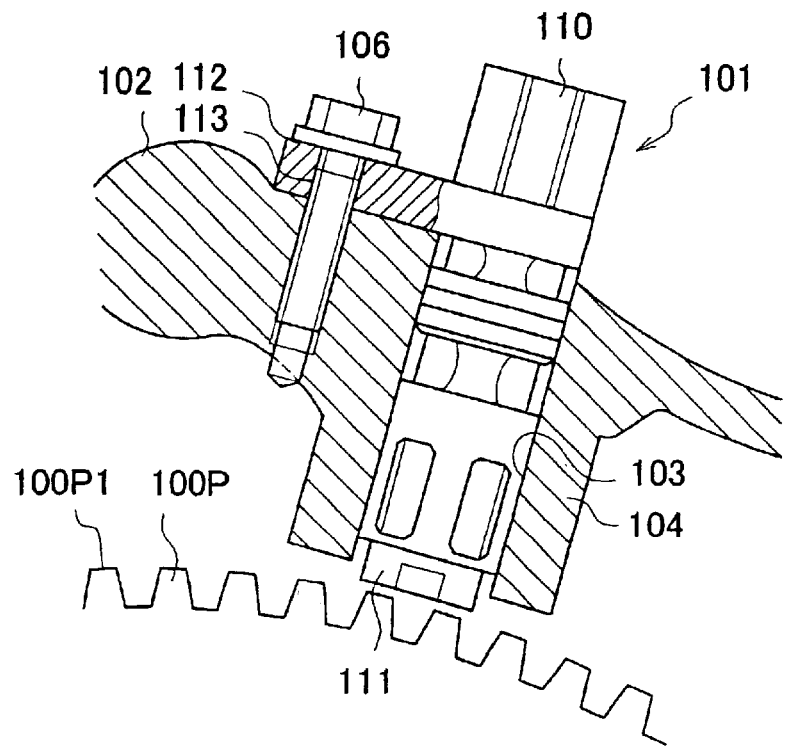
FIG. 4A is a front sectional view and FIG. 4B is a perspective view showing a boss formed on a case.
Figure 4B:
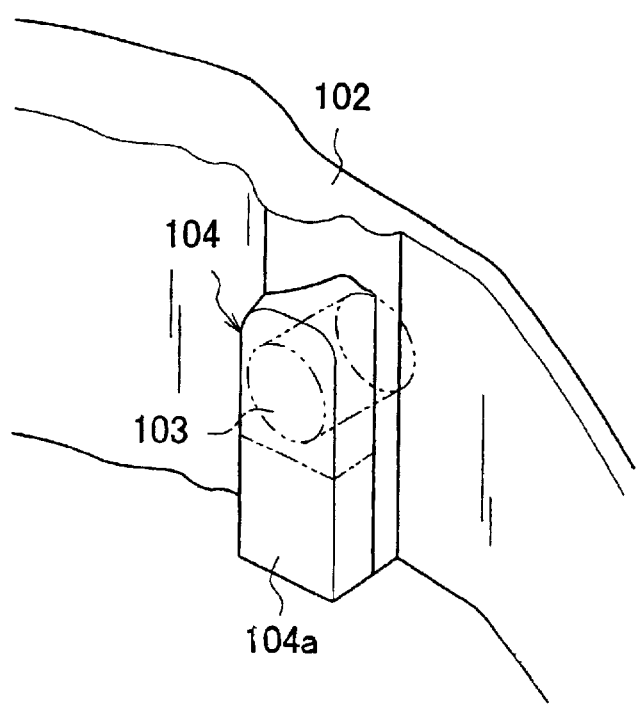

Further another sensor mounting mechanism 1b for a clutch case shown in FIG. 3B may be selected alternatively, in which the structure of spacer 20 is simplified by obviating the gap 30 between the pulse sensor 10 and the spacer 20, if the sufficient thermal insulation between the clutch case 2 and the pulse sensor 10 can be obtained by the spacer 20.

What is claimed is:

1. A clutch assembly, comprising:
    a clutch housed at least partially within a clutch case;
    a detection object, also housed at least partially within a clutch case and rotatable in unison with said clutch, said clutch case having a hole formed therein;
    a sensor for detecting rotation of said detection object, wherein said sensor is disposed in said hole, such that a detector of said sensor is oriented in opposition to said detection object; and
    a thermal insulator disposed around said sensor.

2. A clutch assembly according to claim 1, wherein a gap is provided between said thermal insulator and said sensor.

3. A clutch assembly according to claim 2, wherein said gap includes an inlet for introducing air into said gap and an outlet for discharging said air in said gap into said clutch so that said air can circulate in said gap.

4. A clutch assembly according to claim 3, wherein said outlet is located at a front of said thermal insulator relative to a rotational direction of said detection object around said detector.

5. A clutch assembly according to claim 1, wherein said thermal insulator comprises a mounting element through which said sensor is secured to said clutch case.

6. A clutch assembly according to claim 2, wherein said thermal insulator comprises a mounting element through which said sensor is secured to said clutch case.

7. A clutch assembly according to claim 3, wherein said thermal insulator comprises a mounting element through which said sensor is secured to said clutch case.

8. A clutch assembly according to claim 4, wherein said thermal insulator comprises a
    mounting element through which said sensor is secured to said clutch case.

* * * * *